United States Patent
Jang

(10) Patent No.: US 10,327,205 B2
(45) Date of Patent: Jun. 18, 2019

(54) TLD WIRELESS TERMINAL AND TLD MANAGEMENT SYSTEM, AND TLD MANAGEMENT METHOD

(71) Applicant: U2NG CO., LTD., Uljin-gun (KR)

(72) Inventor: Kyung Seuk Jang, Seoul (KR)

(73) Assignee: U2NG CO., LTD., Uljin-Gun (KR)

( * ) Notice: Subject to any disclaimer, the term of this patent is extended or adjusted under 35 U.S.C. 154(b) by 0 days.

(21) Appl. No.: 15/567,687

(22) PCT Filed: Oct. 5, 2015

(86) PCT No.: PCT/KR2015/010510
§ 371 (c)(1),
(2) Date: Oct. 19, 2017

(87) PCT Pub. No.: WO2016/171348
PCT Pub. Date: Oct. 27, 2016

(65) Prior Publication Data
US 2018/0110003 A1    Apr. 19, 2018

(30) Foreign Application Priority Data

Apr. 20, 2015 (KR) .................. 10-2015-0055514

(51) Int. Cl.
| | |
|---|---|
| H04B 7/00 | (2006.01) |
| H04W 52/02 | (2009.01) |
| G08B 21/02 | (2006.01) |
| G08B 25/10 | (2006.01) |
| H04W 76/28 | (2018.01) |
| H04W 4/029 | (2018.01) |
| H04W 4/90 | (2018.01) |
| G01T 1/11 | (2006.01) |

(Continued)

(52) U.S. Cl.
CPC ........... *H04W 52/0216* (2013.01); *G01T 1/11* (2013.01); *G06Q 10/08* (2013.01); *G08B 21/02* (2013.01); *G08B 25/10* (2013.01); *H04W 4/029* (2018.02); *H04W 4/90* (2018.02); *H04W 36/30* (2013.01); *H04W 76/28* (2018.02); *G08B 21/24* (2013.01); *H04W 64/003* (2013.01);
(Continued)

(58) Field of Classification Search
CPC ......... H04W 36/0011; H04W 36/0022; H04W 40/02; H04W 40/20; H04W 40/22
USPC ................ 370/310, 315, 328, 331, 332, 389
See application file for complete search history.

(56) References Cited

U.S. PATENT DOCUMENTS

| | | | | |
|---|---|---|---|---|
| 5,099,127 A | * | 3/1992 | Kitaguchi | ............... G01T 1/026 250/336.1 |
| 7,148,484 B2 | * | 12/2006 | Craig | ........................ G01J 1/00 250/370.01 |

(Continued)

FOREIGN PATENT DOCUMENTS

| | | |
|---|---|---|
| KR | 20-0368572 | 11/2004 |
| KR | 10-2005-0034762 | 4/2005 |

(Continued)

*Primary Examiner* — Dmitry Levitan
(74) *Attorney, Agent, or Firm* — Lex IP Meister, PLLC

(57) ABSTRACT

Disclosed is a TLD wireless terminal, a TLD management system, and a method for managing the TLD. A TLD wireless terminal adhered to a TLD and communicating with a plurality of repeaters including a first repeater and a second repeater located in a radiation controlled area may include a repeater determining unit configured to selectively determine the first repeater or the second repeater as a repeater for performing communication, and a first communication unit configured to transmit a packet including unique identification information of the wireless terminal to the first repeater.

11 Claims, 13 Drawing Sheets

(51) Int. Cl.
  *G06Q 10/08* (2012.01)
  *H04W 36/30* (2009.01)
  *H04W 64/00* (2009.01)
  *H04W 84/04* (2009.01)
  *G08B 21/24* (2006.01)

(52) U.S. Cl.
  CPC ........... *H04W 84/047* (2013.01); *Y02D 70/00* (2018.01); *Y02D 70/144* (2018.01); *Y02D 70/162* (2018.01)

(56) References Cited

U.S. PATENT DOCUMENTS

| | | | | |
|---|---|---|---|---|
| 8,427,309 | B2 * | 4/2013 | Bullard | H04L 43/065 340/540 |
| 8,572,176 | B2 * | 10/2013 | McKenna | H04W 4/06 463/62 |
| 8,922,342 | B1 * | 12/2014 | Ashenfelter | G07C 9/00087 340/5.82 |
| 9,096,189 | B2 * | 8/2015 | Golden | B60R 25/018 |
| 9,355,416 | B2 * | 5/2016 | Graziano | G06Q 30/02 |
| 10,075,353 | B2 * | 9/2018 | Bullard | H04L 43/065 |
| 2008/0217551 | A1 * | 9/2008 | Zhang | G01T 1/02 250/390.03 |
| 2015/0192658 | A1 * | 7/2015 | Ullah | G01S 5/04 455/456.1 |

FOREIGN PATENT DOCUMENTS

| | | |
|---|---|---|
| KR | 10-2006-0016869 | 2/2006 |
| KR | 10-2011-0003687 | 1/2011 |
| KR | 10-2011-0061028 | 6/2011 |
| KR | 10-1450170 | 10/2014 |

\* cited by examiner

FIG. 13A

| Sequence Number | Packet Type | Battery Value | Sleep Time |
|---|---|---|---|
| | | | |

FIG. 13B

| Packet Start Character | Sequence Number | Gateway Address | Active Tag Address | Packet Type | Battery Value | Sleep Time | ETC | CRC | Packet End Character |
|---|---|---|---|---|---|---|---|---|---|
| | | | | | | | | | |

FIG. 13C

| Packet Start Character | Sequence Number | Gateway Address | Active Tag Address | Packet Type | Current Time | CRC | Packet End Character |
|---|---|---|---|---|---|---|---|
| | | | | | | | |

FIG. 13D

| Sequence Number | Packet Type | Current Time |
|---|---|---|
| | | |

TLD WIRELESS TERMINAL AND TLD MANAGEMENT SYSTEM, AND TLD MANAGEMENT METHOD

TECHNICAL FIELD

The present invention is related to a TLD (thermoluminescence dosimeter) wireless terminal, a TLD management system, and a method for managing the TLD.

BACKGROUND ART

A radiation worker must wear a TLD (thermoluminescence dosimeter) when the worker enters a radiation management area in order to measure exposure to a radiation dose. The TLD is a kind of dosimeter using a thermoluminescence phenomenon that occurs when a crystalline material irradiated by radiation is heated, and measures an accumulated dose for a given time period. The TLD is used as a legal dosimeter and must be stored in a predetermined TLD cabinet in a nuclear power plant.

However, there are cases that a worker does not store the TLD in the cabinet after using the TLD or the worker takes the TLD home, so an accumulated dose cannot be accurately measured, or the worker loses the TLD.

Since the TLD cabinet used in the nuclear power plant is an open system, it is possible for another worker to use the TLD besides the worker himself. Further, when the worker does not store the TLD in the cabinet, a peculiar reading for a person is frequently generated. Herein, the peculiar reading for a person means when a person falls under any of the following items: a person who has been exposed to radiation in excess of a dose limit; a person for whom it is impossible to read the level of radiation due to damage, loss, etc. of the dosimeter; or a person who has submitted the dosimeter two or more months after the replacement period prescribed by the Minister.

Particularly, when an emergency situation such as when the worker is exposed to radiation in excess or the worker is injured occurs while the radiation worker works in the radiation controlled area, the location of the worker cannot be detected. Further, since a request system for rescuing the worker is not equipped, the worker stays in danger.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a TLD (thermoluminescence dosimeter) wireless terminal, a TLD management system, and a TLD management method that can determine a location of a worker and track a location of the TLD when the worker has lost the TLD.

Further, the present invention has been made in an effort to provide a TLD (thermoluminescence dosimeter) wireless terminal, a TLD management system, and a TLD management method that can allow prompt rescue of the worker by notifying a manager when the worker is in an emergency situation.

Further, the present invention has been made in an effort to provide a TLD (thermoluminescence dosimeter) wireless terminal, a TLD management system, and a TLD management method in which the TLD of the worker can be personally checked out and returned through authentication so that the worker cannot use another person's TLD.

Further, the present invention has been made in an effort to provide a TLD (thermoluminescence dosimeter) wireless terminal, a TLD management system, and a TLD management method that can increase a battery replacement time by reducing power consumption of the TLD wireless terminal.

Further, the present invention has been made in an effort to provide a TLD (thermoluminescence dosimeter) wireless terminal, a TLD management system, and a TLD management method that can prevent the TLD from being removed without permission, and that can exactly measure a radiation accumulation dose.

In addition to the above-mentioned objects, an exemplary embodiment of the present invention may be used for other objects that are not mentioned in detail.

Technical Solution

A TLD wireless terminal adhered to a TLD and communicating with a plurality of repeaters including a first repeater and a second repeater located in a radiation controlled area may include a repeater determining unit configured to selectively determine the first repeater or the second repeater as a repeater for performing communication, and a first communication unit configured to transmit a packet including unique identification information of the wireless terminal to the first repeater.

The repeater determining unit may determine the second repeater as the repeater for performing communication, and the first communication unit transmits the packet to the second repeater when signal strength of the second repeater is greater than signal strength of the first repeater.

The TLD wireless terminal may further include a battery configured to supply power to the TLD wireless terminal.

The first communication unit may receive time information and a predetermined packet period value according to a time from the first repeater, and may transmit the packet with the predetermined packet period value based on the time information.

The TLD wireless terminal may further include a gyro sensor configured to detect a motion of the TLD, wherein the first communication unit transmits the packet in a predetermined first period when the motion of the TLD is detected, the first communication unit transmits the packet in a predetermined second period when the motion of the TLD is not detected, and the predetermined first period is shorter than the predetermined second period.

The TLD wireless terminal may further include a switch configured to be pressed in an emergency situation, wherein the first communication unit transmits a packet including emergency information to the first repeater when the switch is pressed.

A TLD management system according to another exemplary embodiment of the present invention may include a TLD wireless terminal configured to adhere to the TLD and transmit a first packet including first unique identification information, a repeater configured to receive the first packet and transmit a second packet including the first unique identification information and second unique identification information, and a server configured to receive the second packet and acquire location information of the TLD wireless terminal, wherein the first unique identification information is unique identification information of the TLD wireless terminal, and the second unique identification information is unique identification information of the repeater.

The TLD management system may further include a cabinet configured to store the TLD, check out the TLD, and return the TLD, wherein the cabinet turns on power of the TLD wireless terminal when the TLD is checked out, and the cabinet turns off power of the TLD wireless terminal when the TLD is returned.

The server may include a check-out and return information storage unit configured to store check-out information and return information of the TLD.

The server may include a database configured to store location information of the repeater, and a location information detector configured to inquire of the location information of the repeater from the database based on the second unique identification information, and to determine the location information of the repeater as the location information of the TLD wireless terminal.

The server may further include a location information storage unit configured to store the location information of the TLD wireless terminal and time information of when the location information of the TLD wireless terminal is acquired.

The server may further include a warning alert unit configured to generate an alarm for notifying of carry-out of the TLD, wherein the warning alert unit may generate the alarm when the location information detector determines that the repeater is located at a front gate from the location information.

A method for managing a TLD according to another exemplary embodiment of the present invention may include: transmitting, by a TLD wireless terminal adhered to the TLD, a first packet including first unique identification information of the TLD wireless terminal; receiving, by a repeater, the first packet and transmitting a second packet including the first unique identification information and second unique identification information of the repeater; receiving, by a server, the second packet and acquiring location information of the TLD wireless terminal; and storing, by the server, the location information of the TLD wireless terminal and time information of when the location information of the TLD wireless terminal is acquired.

The method may further include: determining, by a cabinet, that the TLD is checked out from the cabinet; determining, by the cabinet, that the TLD is returned to the cabinet; and storing, by the server, check-out information, and return information of the TLD.

The method may further include: inquiring, by the server, of the position of the TLD; checking, by the server, whether the TLD is returned based on the return information of the TLD; and determining, by the server, the location of the TLD based on the location information and the time information of the TLD wireless terminal when the TLD is not returned.

Advantageous Effects

According to an exemplary embodiment of the present invention, it is possible to find the location of the worker wearing the TLD, track the location of the TLD when the TLD is lost, and perform a rescue according to a request.

Further, it is possible to prevent a worker from using another person's TLD through self-authentication, the number of persons with peculiar readings can be minimized, and a battery replacement time can be increased by reducing power consumption of the TLD wireless terminal.

DESCRIPTION OF THE DRAWINGS

FIG. 13A, 13B, 13C and 13D show an example of a data packet structure according to an exemplary embodiment of the present invention.

MODE FOR INVENTION

Figure 1:
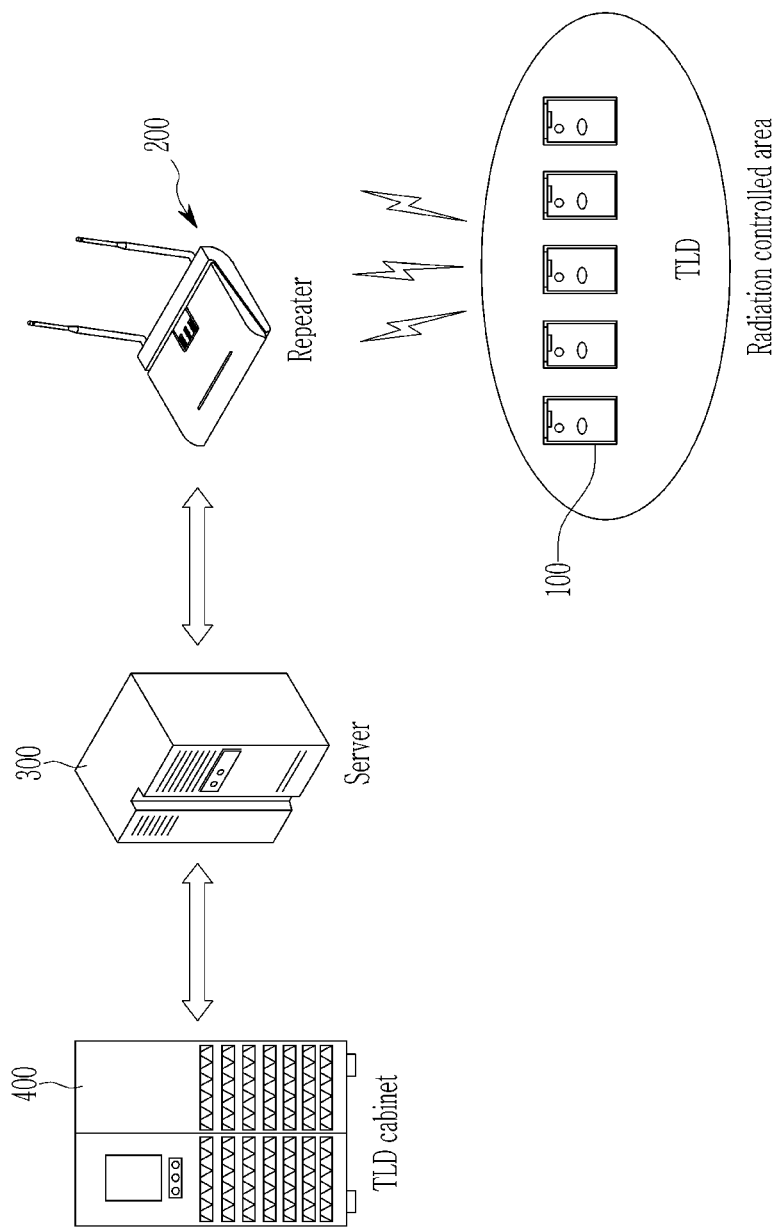
FIG. 1 is a drawing illustrating a TLD management system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification. Furthermore, detailed descriptions are not given to the well-known arts.

In addition, throughout this specification and the claims which follow, unless explicitly described to the contrary, the word "comprise" and variations such as "comprises" or "comprising" will be understood to imply the inclusion of stated elements but not the exclusion of any other elements. Also, the terms of a unit, a device, and a module in the present specification represent a unit for processing a predetermined function or operation, which can be realized by hardware, software, or combination of hardware and software.

Figure 2:
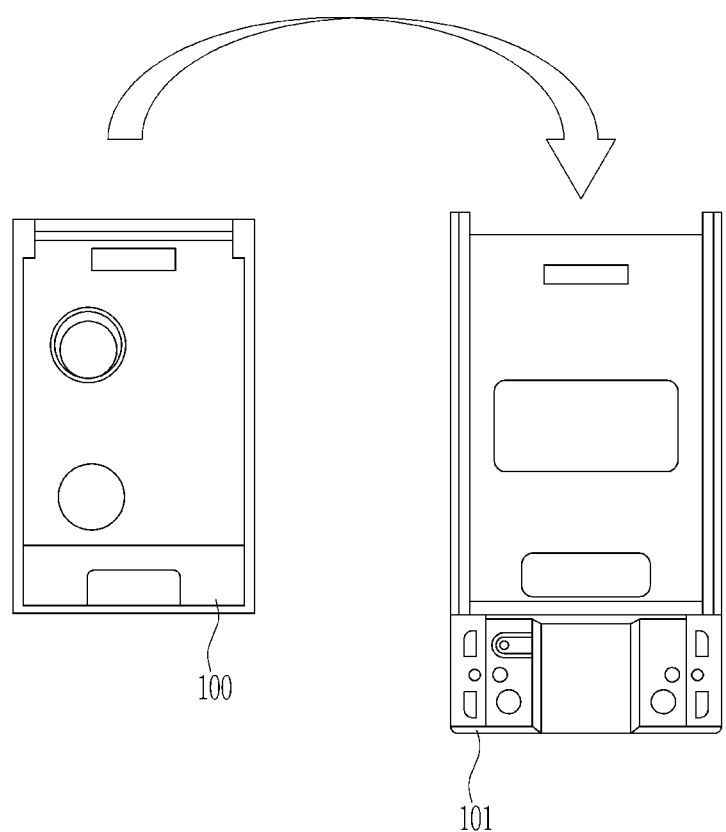
FIG. 2 is a drawing illustrating a TLD wireless terminal according to an exemplary embodiment of the present invention.

FIG. 1 is a drawing illustrating a TLD management system according to an exemplary embodiment of the present invention, and FIG. 2 is a drawing illustrating a TLD wireless terminal according to an exemplary embodiment of the present invention.

A TLD 100 management system according to an exemplary embodiment of the present invention includes a TLD (thermoluminescence dosimeter) 100 including a TLD wireless terminal 101, a repeater 200, a server 300, and a cabinet 400.

As shown in FIG. 1, the TLD wireless terminal 101 adhered to the TLD 100 performs wireless communication with the repeater 200 located in a radiation controlled area by using a wireless communication module. Since the TLD wireless terminal 101 wirelessly communicates with the repeater 200 in the entire radiation controlled area, a location of the TLD wireless terminal 101 in the radiation controlled area can be detected, a location of the TLD 100 can be detected by using the location of the TLD wireless terminal 101, and a location of a worker having the TLD 100 can be detected by using the location of the TLD 100.

The TLD wireless terminal 101 is operated by power supplied from a battery installed therein. Further, the TLD wireless terminal 101 can use a low-power frequency by performing short range wireless communication (e.g., Zigbee) based on IEEE 802.15.4. Accordingly, power consumption of the battery can be reduced.

The repeater 200 receives data including unique identification information of the TLD wireless terminal 101 from the TLD wireless terminal 101 in real-time, and transmits the unique identification information of the TLD wireless terminal 101 and unique identification information of the repeater 200 itself to the server 300. The server 300 detects the location of the TLD 100 by detecting the location of the TLD wireless terminal 101 based on location information of the repeater 200 stored in the server 300 and the unique identification information received from the repeater 200.

The server 300 detects the location of the TLD wireless terminal 101, and manages a check-out process and a return process of the TLD 100 with the TLD wireless terminal 101 through the cabinet 400. Therefore, it is possible to prevent the worker from checking out a TLD 100 of another person, and thus the TLD 100 cannot be checked out without permission.

The cabinet 400 performs check-out, return, and storage of the TLD 100 with the TLD wireless terminal 101. The cabinet 400 is electrically connected with the server 300, and transmits check-out or return information of the TLD 100 to the server 300.

Hereinafter, the TLD wireless terminal 101 according to an exemplary embodiment of the present invention will be described in detail with reference to FIG. 3 to FIG. 7.

Figure 3:
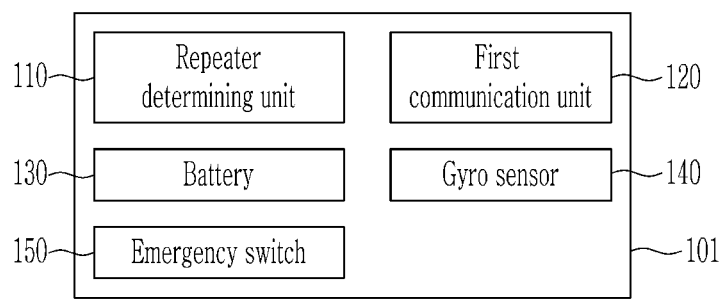
FIG. 3 is a block diagram illustrating a TLD wireless terminal according to an exemplary embodiment of the present invention.
Figure 4:
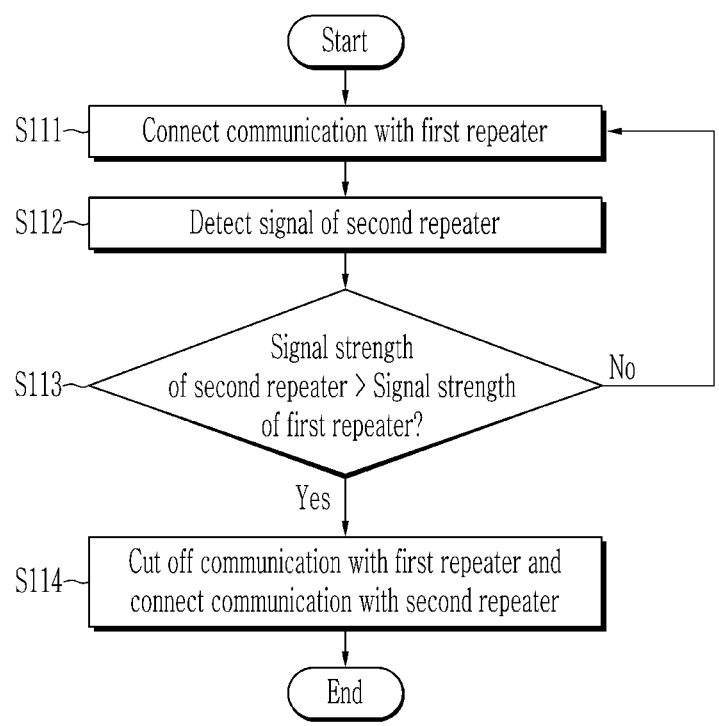
FIG. 4 is a flowchart illustrating a handover process between a TLD wireless terminal and a repeater according to an exemplary embodiment of the present invention.
Figure 5:
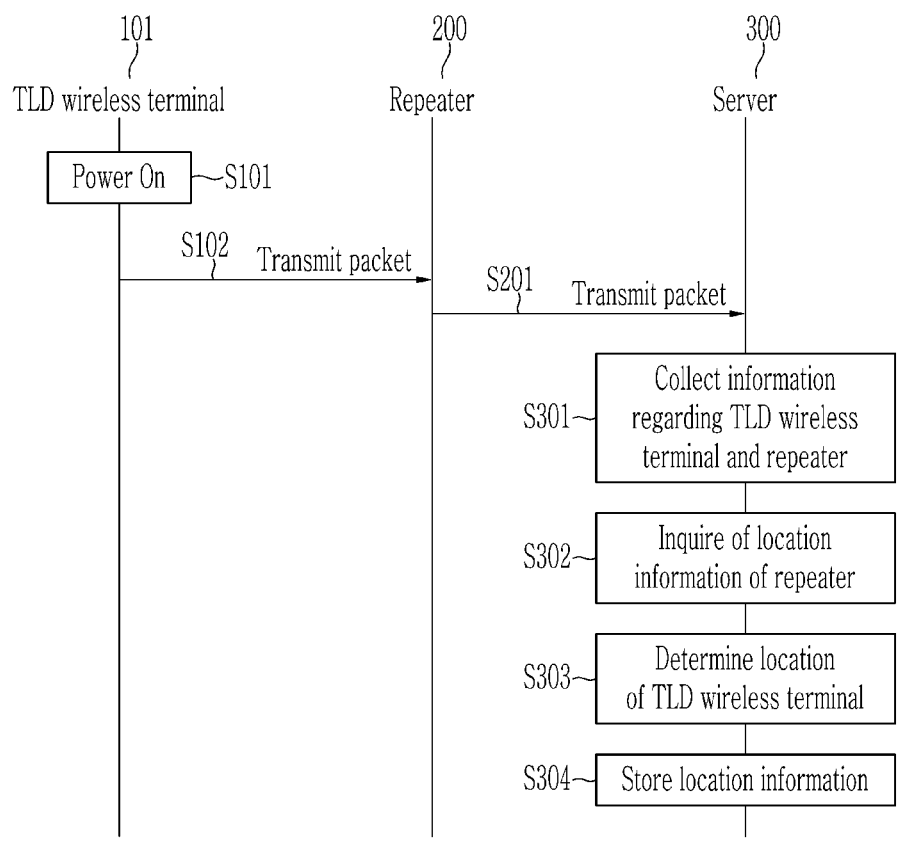
FIG. 5 is a flowchart of a process for acquiring location information of a TLD having a TLD wireless terminal according to an exemplary embodiment of the present invention.
Figure 6:
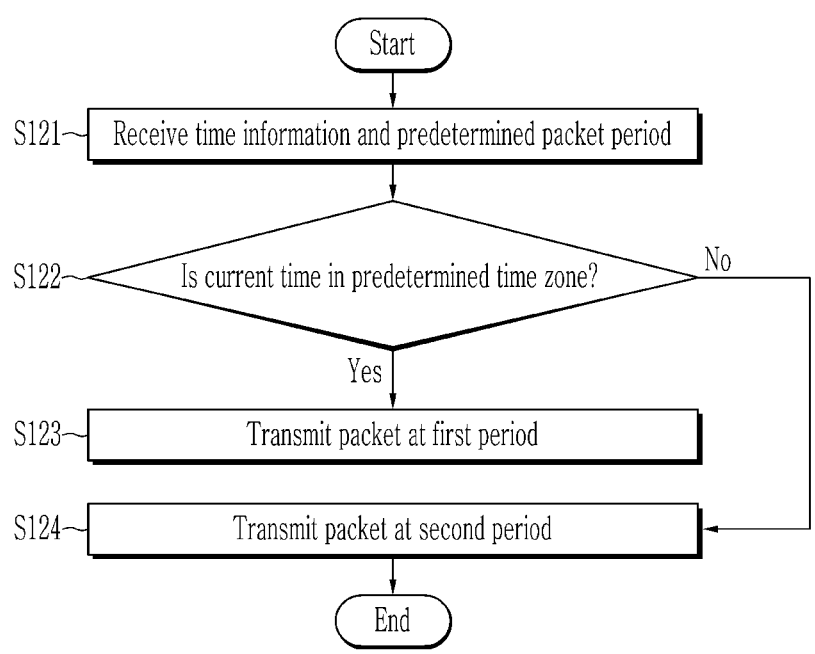
FIG. 6 and FIG. 7 are flowcharts of a process for determining a packet transmission period of a TLD wireless terminal according to an exemplary embodiment of the present invention.
Figure 7:
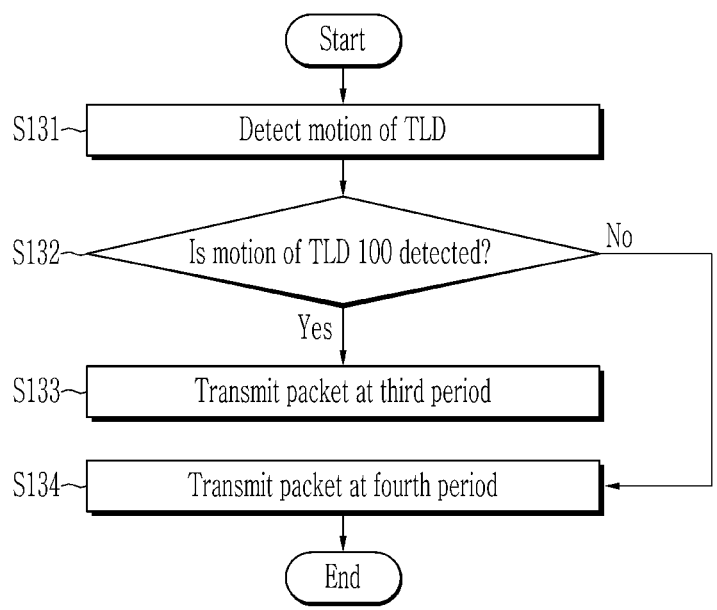

FIG. 3 is a block diagram illustrating a TLD wireless terminal according to an exemplary embodiment of the present invention, and FIG. 4 is a flowchart illustrating a handover process between a TLD wireless terminal 101 and a repeater 200 according to an exemplary embodiment of the present invention. FIG. 5 is a flowchart of a process for acquiring location information of a TLD having a TLD wireless terminal according to an exemplary embodiment of the present invention, and FIG. 6 and FIG. 7 are flowcharts of a process for determining a packet transmission period of a TLD wireless terminal according to an exemplary embodiment of the present invention.

The TLD wireless terminal 101 according to an exemplary embodiment of the present invention includes a repeater determining unit 110, a first communication unit 120, a battery 130, a gyro sensor 140, and an emergency switch 150.

The repeater determining unit 110 determines a repeater 200 for connecting communication among a plurality of repeaters 200 based on signal strength of the repeater 200. The TLD wireless terminal 101 transmits the unique identification information of the TLD wireless terminal 101 to the repeater 200 by connecting communication with the repeater 200 determined by the repeater determining unit 110. As shown in FIG. 4, the TLD wireless terminal 101 may connect communication with one repeater 200 determined by the repeater determining unit 110 among a plurality of repeaters 200.

First, the TLD wireless terminal 101 connects communication with a first repeater of which a signal is detected at step S111. Since a distance between the TLD wireless terminal 101 and the first repeater connected with the TLD wireless terminal 101 becomes longer when the worker having the TLD 100 moves away from it, the TLD wireless terminal 101 connects communication with another repeater closest to the TLD wireless terminal 101. When the TLD wireless terminal 101 detects a signal of a second repeater differing from the first repeater at step S112, the repeater determining unit 110 compares signal strength of the first repeater with signal strength of the second repeater in order to determine the repeater 200 for connecting communication at step S113. When the signal strength of the second repeater is greater than the signal strength of the first repeater, the repeater determining unit 110 determines the second repeater as a repeater 200 for connecting communication. Accordingly, the TLD wireless terminal 101 cuts off communication with the first repeater and connects communication with the second repeater at step S114. When the signal strength of the second repeater is less than the signal strength of the first repeater, the repeater determining unit 110 continuously determines the first repeater as a repeater 200 for connecting communication and the TLD wireless terminal 101 continuously performs communication with the first repeater at step S111.

Herein, the repeater 200 with relatively greater signal strength that is detected by the TLD wireless terminal 101 may be the repeater 200 closest to the TLD wireless terminal 101, and the repeater determining unit 110 determines the repeater 200 closest to the TLD wireless terminal 101 for connecting communication.

The first communication unit 120 transmits a packet including the unique identification information to the repeater 200 determined by the repeater determining unit 110. The packet transmitted by the first communication unit 120 will be described later. As shown in FIG. 5, the server 300 detects a location of the TLD wireless terminal 101 based on the packet transmitted from the first communication unit 120.

First, when the TLD wireless terminal 101 is turned on at step S101, the TLD wireless terminal 101 transmits the packet to the repeater 200 at step S102, and the repeater 200 transmits the packet including the unique identification information of the TLD wireless terminal 101 and the repeater 200 itself to the server 300 at step S201. The server 300 collects information regarding the TLD wireless terminal 101 and the repeater 200 based on the packet received from the repeater 200 at step S301. For example, the packet transmitted from the repeater 200 may include MAC addresses of the TLD wireless terminal 101 and the repeater 200, and the server 300 may collect the unique identification information of the TLD wireless terminal 101 and the repeater 200 from the MAC addresses. The server 300 inquires of location information of the repeater 200 stored in the server 300 based on the unique identification information of the repeater 200 at step S302. Since the repeaters 200 are fixedly located all over the radiation controlled area, the server 300 has the location information of each repeater 200. The server 300 detects the location of the TLD wireless terminal 101 based on the location information of the repeater 200 at step S303. In this case, the server 300 determines the location of the TLD wireless terminal 101 as the location of the repeater 200 that transmits the packet including the unique identification information of the TLD wireless terminal 101 at step 303. The server 300 also matches the location information to the unique identification information of the TLD wireless terminal 101 and then stores the location information at step S304.

When the server 300 stores the location information of the TLD wireless terminal 101 at step S304, the server 300 stores time information of when the packet is transmitted from the repeater 200. Accordingly, the server 300 can manage the location information of the TLD wireless terminal 101 according to a time change.

As such, since the location information of the TLD wireless terminal 101 according to the time change, and the location of the TLD 100 and the worker can be detected, the TLD 100 can be easily found when the TLD 100 is lost, and thus it is possible to efficiently manage the TLD 100 and reduce managing cost of the TLD 100.

The battery 130 supplies power to the TLD wireless terminal 101. When the battery 130 is discharged and the power cannot be supplied to the TLD wireless terminal 101, the TLD wireless terminal 101 cannot communicate with the repeater 200 and detect the location of the TLD wireless terminal 101. Therefore, the TLD wireless terminal 101 performs low-power operation so that the battery 130 is not discharged within a short time. As shown in FIG. 6 to FIG. 7, the TLD wireless terminal 101 may perform the low-power operation by adjusting a packet transmission period.

Referring to FIG. 6, the TLD wireless terminal 101 receives time information of when the packet is transmitted from the repeater 200 to the server 300 and a predetermined packet period value according to a time at step S121. The time information is current time information, and the predetermined packet period value according to the time is a packet transmission period value in a specific time zone. When the TLD wireless terminal 101 determines that the current time is in the predetermined time zone based on the time information at step S122, the TLD wireless terminal 101 transmits the packet at a first period based on the predetermined packet period value at step S123. When the TLD wireless terminal 101 determines that the current time is not in the predetermined time zone based on the time information at step S122, the TLD wireless terminal 101 transmits the packet at a second period based on the predetermined packet period value at step S124. For example, the TLD wireless terminal 101 may transmit the packet at 10 second periods between 7 am and 7 pm in the daytime, and transmit the packet at 1 minute periods between 7 pm and 7 am in the nighttime.

In FIG. 6, the packet transmission period is adjusted based on two time zones, but the packet transmission period of the present invention is not limited thereto and the packet transmission period may be adjusted by variously subdividing the packet transmission period corresponding to specific time zones.

The low-power operation will be described referring to FIG. 7. The TLD wireless terminal 101 detects a motion of the TLD 100 by using the gyro sensor 140 at step S131. The motion of the TLD 100 may mean a movement of the worker having the TLD 100, and that the TLD 100 does not move may mean that the worker having the TLD 100 does not move. When the motion of the TLD 100 is detected at step S132, the TLD wireless terminal 101 transmits the packet at a third period at step S133. When the motion of the TLD 100 is not detected for a predetermined time, the TLD wireless terminal 101 transmits the packet at a fourth period that is longer than the third period at step S134. For example, the TLD wireless terminal 101 may transmit the packet at 1 minute periods when the motion of the TLD 100 is not detected for 30 minutes.

As such, when power consumption of the battery 130 is reduced by adjusting the packet transmission period, a replacement cycle of the battery 130 installed in the TLD wireless terminal 101 is extended and a managing cost of the TLD wireless terminal 101 is reduced.

The emergency switch 150 includes a switch that the worker can press in an emergency situation. When the emergency switch 150 is pressed, the first communication unit 120 transmits the packet including emergency information to the repeater. In this case, the first communication unit 120 may transmit the packet including the emergency information regardless of the predetermined packet period.

The TLD 100 management system will be described in detail with reference to FIG. 8 to FIG. 12.

Figure 8:
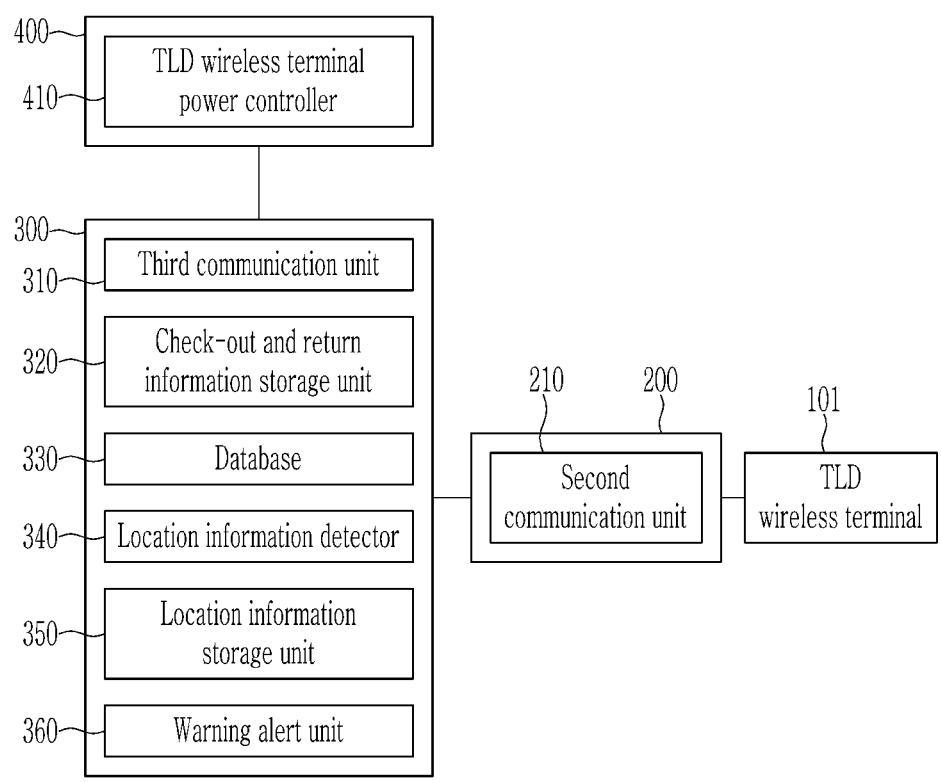
FIG. 8 is a block diagram illustrating a TLD management system according to an exemplary embodiment of the present invention.
Figure 9:
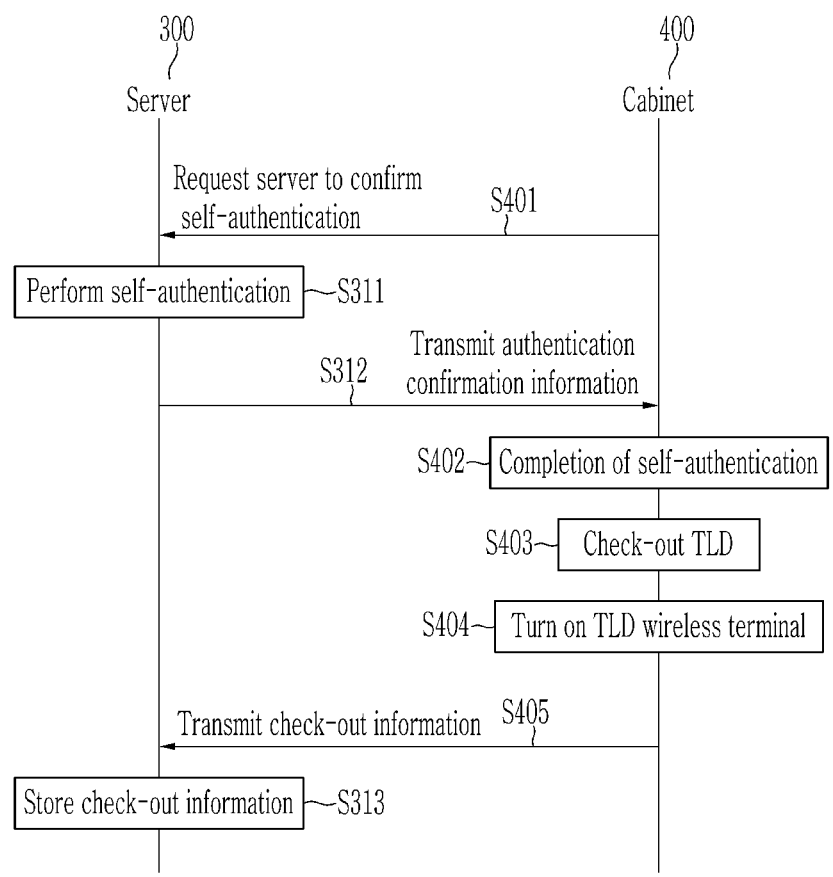
FIG. 9 is a flowchart of a process for checking out a TLD with a TLD wireless terminal according to an exemplary embodiment of the present invention.
Figure 10:
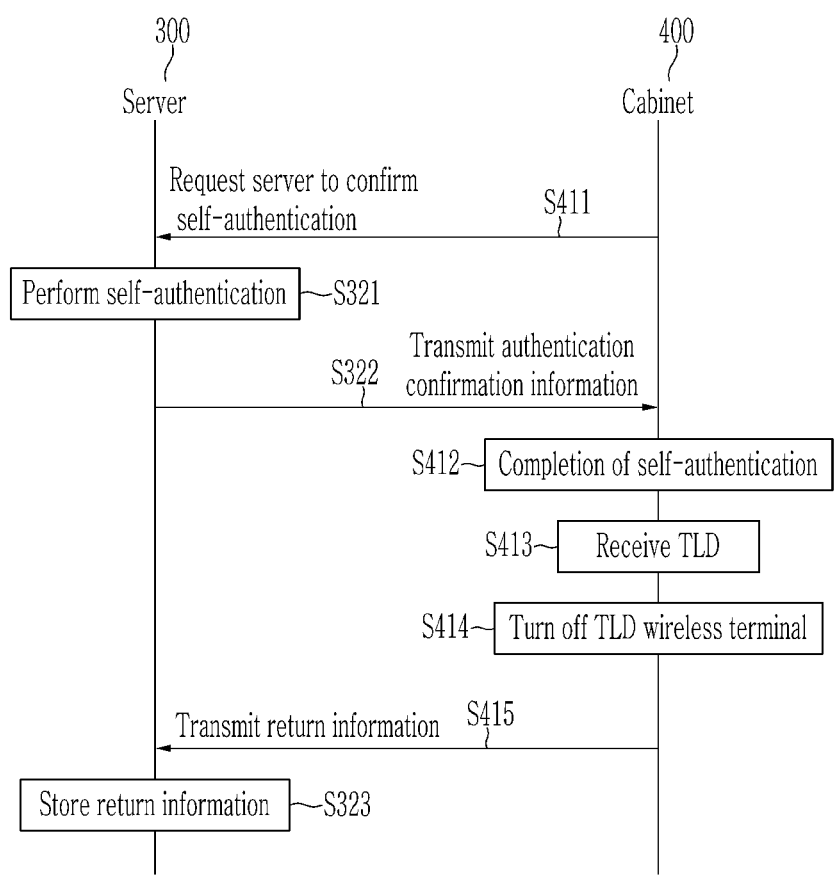
FIG. 10 is a flowchart of a process for returning a TLD with a TLD wireless terminal according to an exemplary embodiment of the present invention.
Figure 11:
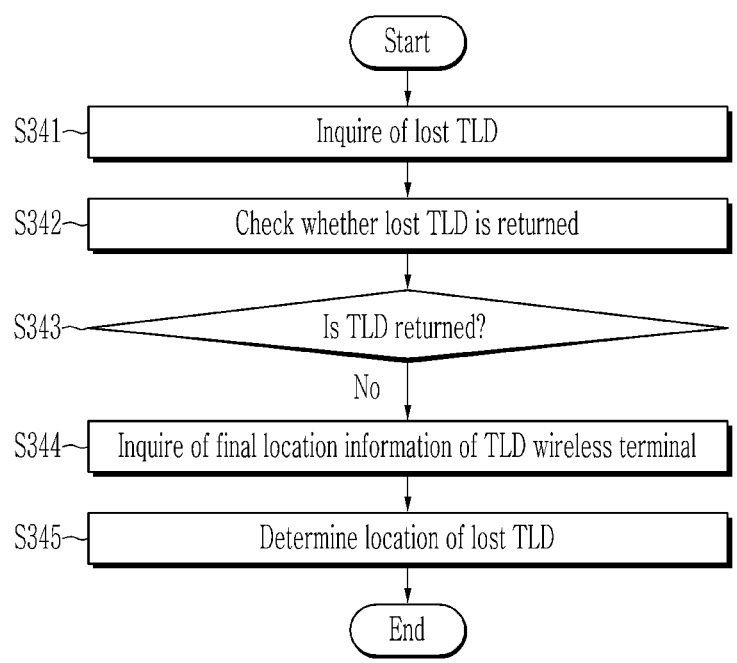
FIG. 11 is a flowchart of a method of checking a location of a lost TLD with a TLD wireless terminal according to an exemplary embodiment of the present invention.
Figure 12:
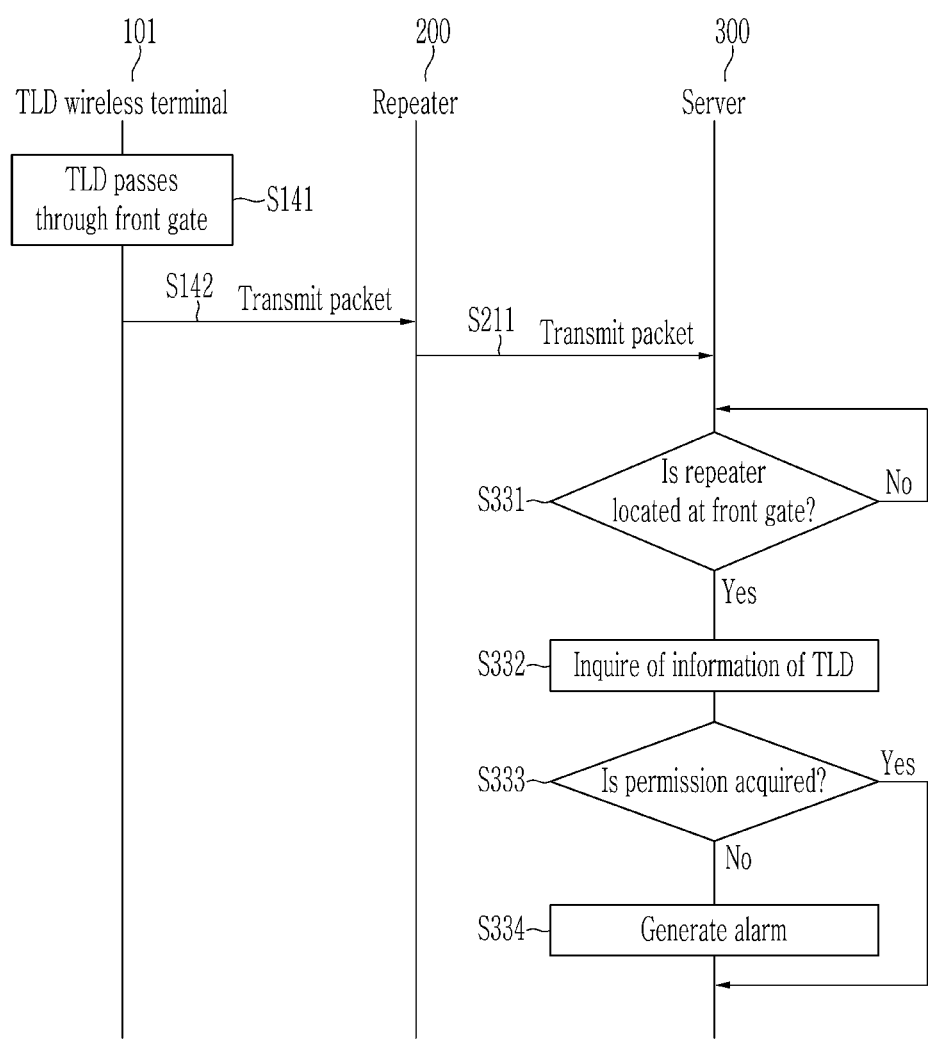
FIG. 12 is a flowchart of a method for preventing unauthorized removal of a TLD with a TLD wireless terminal according to an exemplary embodiment of the present invention.

FIG. 8 is a block diagram illustrating a TLD management system according to an exemplary embodiment of the present invention. FIG. 9 is a flowchart of a process for checking out a TLD having a TLD wireless terminal according to an exemplary embodiment of the present invention, and FIG. 10 is a flowchart of a process for returning a TLD having a TLD wireless terminal according to an exemplary embodiment of the present invention. FIG. 11 is a flowchart of a method of checking location of the lost TLD with a TLD wireless terminal according to an exemplary embodiment of the present invention, and FIG. 12 is a flowchart of a method for preventing the TLD with the TLD wireless terminal from being carried out without permission according to an exemplary embodiment of the present invention.

As shown in FIG. 1 and FIG. 8, the TLD 100 management system according to an exemplary embodiment of the present invention includes a TLD 100 with a TLD wireless terminal 101, a repeater 200, a server 300, and a cabinet 400.

As described above, the TLD wireless terminal 101 adhered to the TLD 100 transmits the packet including the unique identification information to the repeater 200. The repeater 200 transmits the packet including the unique identification information of the TLD wireless terminal 101 and the repeater 200 itself to the server 300 by using a second communication unit 210. Further, the repeater 200 may transmit the packet including the emergency information to the server 300.

The server 300 includes a third communication unit 310, a check-out and return information storage unit 320, a database 330, a location information detector 340, a location information storage unit 350, and a warning alert unit 360.

The cabinet 400 stores the TLD 100, checks out the TLD 100, and returns the TLD 100. A TLD wireless terminal power controller 410 of the cabinet 400 turns the TLD wireless terminal 101 on and off by controlling power supplied to the TLD wireless terminal 101 through wireless communication between the TLD wireless terminal power controller 410 and the TLD wireless terminal 101.

Referring to FIG. 9, the cabinet 400 loading the TLD 100 requests the server 300 to confirm self-authentication of the worker at step S401. For example, when the worker checks out the TLD 100 from the cabinet 400, the cabinet 400 requests the worker to input a fingerprint of the worker, and the cabinet 400 requests the server 300 to confirm the fingerprint of the worker. The server 300 performs the self-authentication by checking whether or not self-authentication information transmitted from the cabinet 400 is identical to information previously stored in the server 300 at step S311. The server 300 transmits authentication confirmation information to the cabinet at step S312. When the self-authentication is completed at step S402, the cabinet 400 allows check-out of the TLD 100. When the worker checks out the TLD 100 at step S403, the TLD wireless terminal power controller 410 turns on the TLD wireless terminal 101 at step S404. The cabinet 400 transmits check-out information of the TLD 100 to the server 300 at step S405, and the server 300 stores the check-out information at step S313.

When the check-out process of the TLD 100 is used, as shown in FIG. 9, since the worker cannot check out another person's TLD, it is possible to prevent the TLD from being stolen, and for a radiation exposure dose to be exactly measured with respect to the person with a peculiar reading and the worker for a predetermined time. Further, since the check-out information is stored in the server 300, history of checking out of the TLD 100 can be checked.

Referring to FIG. 10, the cabinet 400 requests the server 300 to confirm self-authentication of the worker at step S411. The server 300 performs the self-authentication by checking whether or not self-authentication information transmitted from the cabinet 400 is identical to information previously stored in the server 300 at step S321. The server 300 then transmits authentication confirmation information to the cabinet at step S322. When the self-authentication is completed at step S412, the cabinet 400 receives the TLD 100 from the worker at step S413. The cabinet 400 then turns off the TLD wireless terminal 101 by using the TLD wireless terminal power controller 410 at step S414. The cabinet 400 transmits return information of the TLD 100 to the server 300 at step S415, and the server 300 stores the return information at step S323.

When using the return process of the TLD 100 in FIG. 10, the returned TLD wireless terminal 101 is turned off by the TLD wireless terminal power controller 410, and thus power consumption of the battery installed in the TLD wireless terminal 101 can be prevented. Further, the return information of the TLD 100 is stored in the server 300, so the return history of the TLD 100 can be checked.

Regarding the server 300, the third communication unit 310 transmits the packet including current time information to the repeater 200. The repeater 200 may transmit the packet received from the server 300 to the TLD wireless terminal 101.

The check-out and return information storage unit 320 stores check-out information and return information of the TLD 100 transmitted from the cabinet 400, and the database 330 stores the location information of each repeater 200.

The location information detector 340 acquires the location information of the TLD wireless terminal 101. The location information detector 340 inquires of the location information of the repeater 200 from the database 330 based on the unique identification information of the repeater 200 transmitted from the repeater 200. The location information detector 340 determines the location information of the repeater 200 as the location information of the TLD wireless terminal 101. The location information detector 340 may acquire the location information of the TLD 100 from the location information of the TLD wireless terminal 101.

The location information storage unit 350 stores time information of when location information of the TLD wireless terminal 101 and the location information of the TLD wireless terminal 101 are acquired. The server 300 confirms a position of a lost TLD 100 based on the location information and the time information of the location information storage unit 350.

A checking method of location of the lost TLD will be described with reference to FIG. 11. The server 300 inquires of the lost TLD 100 at step S341. The server 300 checks whether the lost TLD 100 is returned by using the return information stored in the check-out and return information storage unit 320 at step S342. When the lost TLD 100 is not returned at step S343, the server 300 inquires of final location information of the TLD wireless terminal 101 adhered to the lost TLD 100 stored in the location information storage unit 350 at step S344. The server 300 may check the most recently stored location information and time information of the lost TLD 100 from the final location information, and determine the location of the lost TLD 100 at step 345.

As described above, the location of the lost TLD 100 can be easily found based on the location information of the TLD wireless terminal 101.

The warning alert unit 360 generates an alarm for notifying carry-out of the TLD 100 when the TLD 100 passes a front gate repeater 200 located at a front gate. As such, when the worker does not return the TLD 100 to the cabinet 400 and carries out the TLD 100 without permission, it is possible to prevent the TLD 100 from being carried out by using the warning alert unit 360.

A method for preventing the TLD from being carried out without permission will be described with reference to FIG. 12. When the TLD 100 passes through the front gate at step S141, the TLD wireless terminal 101 transmits a packet to the front gate repeater 200 located in the front gate at step S142. The repeater 200 transmits the packet including the unique identification information of the TLD wireless terminal 101 and the repeater 200 itself to the server 300 at step S211. The server 300 determines whether the repeater 200 is located at the front gate based on the packet transmitted from the repeater 200 at step S331. When the repeater 200 is located at the front gate, the server 300 inquires of the information of the TLD 100 at step S332, and determines whether the TLD 100 has permission to be carried out at step S333. The information of the TLD 100 includes permission information that the TLD can be carried out. In accordance with circumstance, there is a case that the TLD 100 should be carried out, so the server 300 determines whether the TLD 100 has permission to be carried out at step S333. When the TLD 100 does not have permission, the warning alert unit 360 of the server 300 generates an alarm for notifying carry-out of the TLD 100 at step S334.

When the alarm is generated by the warning alert unit 360, a manager can prevent the TLD 100 from being carried out without permission. Accordingly, it is possible to prevent the TLD 100 from being lost outside of the radiation controlled area, and the radiation exposure dose of the worker can be exactly measured in the radiation controlled area.

Herein, a packet structure of the TLD 100 management system using the TLD wireless terminal 101 will be described in detail with reference to FIG. 13A to FIG. 13D.

FIG. 13A shows an example of a data packet structure transmitted from the TLD wireless terminal 101 to the repeater 200, and FIG. 13B shows an example of a data packet structure transmitted from the repeater 200 to the server 300. FIG. 13C shows an example of a data packet structure transmitted from the server 300 to the repeater 200, and FIG. 13D shows an example of a data packet structure transmitted from the repeater 200 to the TLD wireless terminal 101. FIG. 13A to FIG. 13D show a part of a data packet of an entire packet structure, and a part of a header is omitted.

Referring to FIG. 13A, the data packet transmitted from the TLD wireless terminal 101 to the repeater 200 includes a packet sequence number, a packet type, a battery value showing a residual amount of the battery of the TLD wireless terminal 101, and a sleep time showing a packet transmission period of the TLD wireless terminal 101. Since the TLD wireless terminal 101 and the repeater 200 perform short range wireless communication based on IEEE 802.15.4, the unique identification information of the TLD wireless terminal 101 is included in the part of the header of the packet. Therefore, the repeater 200 detects the unique identification information of the TLD wireless terminal 101 from the packet transmitted from the TLD wireless terminal 101, and determines a MAC address of the TLD wireless terminal 101.

Referring to FIG. 13B, the data packet transmitted from the repeater 200 to the server 300 includes a packet start character, a packet sequence number, a gateway address showing a MAC address of the repeater 200, an active tag address showing a MAC address of the TLD wireless terminal 101, a packet type, a battery value showing a residual amount of the battery of the TLD wireless terminal 101, a sleep time showing a packet transmission period of the TLD wireless terminal 101, an ETC showing a reserved packet, a CRC (Cyclic Redundancy Check), and a packet end character. The repeater 200 detects the MAC address of the TLD wireless terminal 101 and transmits the MAC addresses of the TLD wireless terminal 101 and the repeater 200 itself to the server 300.

Referring to FIG. 13C, the data packet transmitted from the server 300 to the repeater 200 includes a packet start character, a packet sequence number, a gateway address showing a MAC address of the repeater 200, an active tag address showing a MAC address of the TLD wireless terminal 101, a current time, a CRC (Cyclic Redundancy Check), and a packet end character.

Referring to FIG. 13D, the data packet transmitted from the repeater 200 to the TLD wireless terminal 101 includes a packet sequence number, a packet type, and a current time.

While the structure of the data packet has been described referring to FIG. 13A to FIG. 13D, it is to be understood that the present invention is not limited to the disclosed embodiment, and on the contrary, is intended to cover various modifications and equivalent arrangements included within the spirit and scope of the appended claims.

As mentioned above, the TLD wireless terminal 101 adhered to the TLD 100 for detecting the TLD 100 has been described, but the present invention is not limited thereto, and a wireless communication module may be installed in the TLD.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

100: TLD
101: TLD wireless terminal
110: radiation absorber
120: repeater determining unit
130: first communication unit
140: battery
150: gyro sensor
200: repeater
210: second communication unit
300: server
310: third communication unit
320: check-out and return information storage unit
330: database
340: location information detector
350: location information storage unit
360: warning alert unit
400: cabinet
410: TLD wireless terminal power controller

The invention claimed is:

1. A thermoluminescence dosimeter (TLD) wireless terminal adhered to a TLD and communicating with a plurality of repeaters including a first repeater and a second repeater located in a radiation controlled area, the TLD wireless terminal comprising:
a repeater determining unit configured to selectively determine the first repeater or the second repeater as a repeater for performing communication;
a first communication unit configured to transmit a packet including unique identification information of the wireless terminal to the first repeater; and
a gyro sensor configured to detect a motion of the TLD,
wherein the first communication unit receives time information and a predetermined packet period value according to a time from the first repeater, and transmits the packet with the predetermined packet period value based on the time information,
wherein the first communication unit transmits the packet in a predetermined first period when the motion of the TLD is detected,
wherein the first communication unit transmits the packet in a predetermined second period when the motion of the TLD is not detected, and
wherein the predetermined first period is shorter than the predetermined second period.

2. The TLD wireless terminal of claim 1, wherein
the repeater determining unit determines the second repeater as the repeater for performing communication, and the first communication unit transmits the packet to the second repeater when signal strength of the second repeater is greater than signal strength of the first repeater.

3. The TLD wireless terminal of claim 1, further comprising
a battery configured to supply power to the TLD wireless terminal.

4. The TLD wireless terminal of claim 1, further comprising
a switch configured to be pressed in an emergency situation,
wherein the first communication unit transmits the packet including emergency information to the first repeater when the switch is pressed.

5. A thermoluminescence dosimeter (TLD) management system comprising:
   a TLD wireless terminal configured to adhere to the TLD and transmit a first packet including first unique identification information;
   a repeater configured to receive the first packet and transmit a second packet including the first unique identification information and second unique identification information;
   a server configured to receive the second packet and acquire location information of the TLD wireless terminal; and
   a cabinet configured to store the TLD, check out the TLD, and return the TLD,
   wherein the first unique identification information is unique identification information of the TLD wireless terminal, and the second unique identification information is unique identification information of the repeater, and
   wherein the cabinet turns on power of the TLD wireless terminal when the TLD is checked out, and the cabinet turns off power of the TLD wireless terminal when the TLD is returned.

6. The TLD management system of claim 5, wherein the server includes a check-out and return information storage unit configured to store check-out information and return information of the TLD.

7. The TLD management system of claim 5, wherein the server includes:
   a database configured to store location information of the repeater; and
   a location information detector configured to inquire of the location information of the repeater from the database based on the second unique identification information, and to determine the location information of the repeater as the location information of the TLD wireless terminal.

8. The TLD management system of claim 7, wherein the server further includes a location information storage unit configured to store the location information of the TLD wireless terminal and time information of when the location information of the TLD wireless terminal is acquired.

9. The TLD management system of claim 7, wherein the server further includes
   a warning alert unit configured to generate an alarm for notifying carry-out of the TLD,
   wherein the warning alert unit generates the alarm when the location information detector determines that the repeater is located at a front gate from the location information.

10. A method for managing a thermoluminescence dosimeter (TLD), the method comprising:
    transmitting, by a TLD wireless terminal adhered to the TLD, a first packet including first unique identification information of the TLD wireless terminal;
    receiving, by a repeater, the first packet and transmitting a second packet including the first unique identification information and second unique identification information of the repeater;
    receiving, by a server, the second packet and acquiring location information of the TLD wireless terminal;
    storing, by the server, the location information of the TLD wireless terminal and time information of when the location information of the TLD wireless terminal is acquired;
    determining, by a cabinet, that the TLD is checked out from the cabinet;
    determining, by the cabinet, that the TLD is returned to the cabinet; and
    storing, by the server, check-out information and return information of the TLD.

11. The method of claim 10, further comprising:
    inquiring, by the server, of the position of the TLD;
    checking, by the server, whether the TLD is returned based on the return information of the TLD; and
    determining, by the server, the location of the TLD based on the location information and the time information of the TLD wireless terminal when the TLD is not returned.

* * * * *